W. O. SHADBOLT.
TRUCK.
APPLICATION FILED FEB. 19, 1919.
1,399,583.
Patented Dec. 6, 1921.
3 SHEETS—SHEET 2.
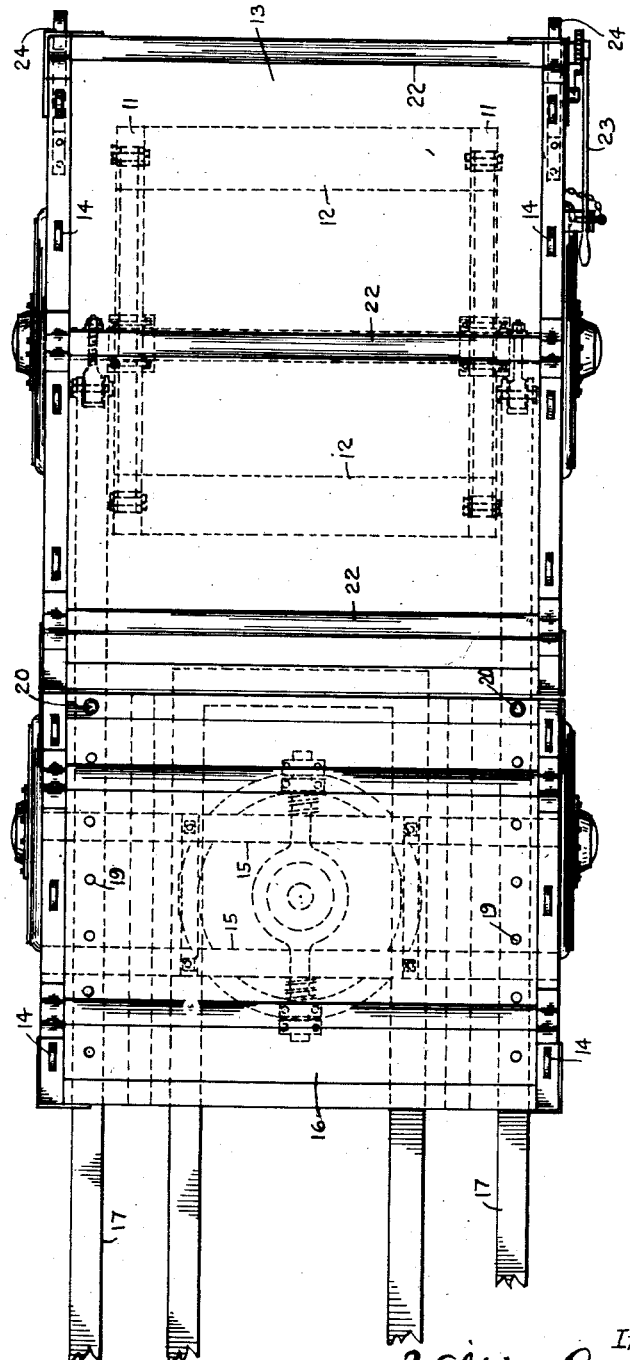
Inventor:
William Oscar Shadbolt
By his Attorney.
Edmond Congar Brown

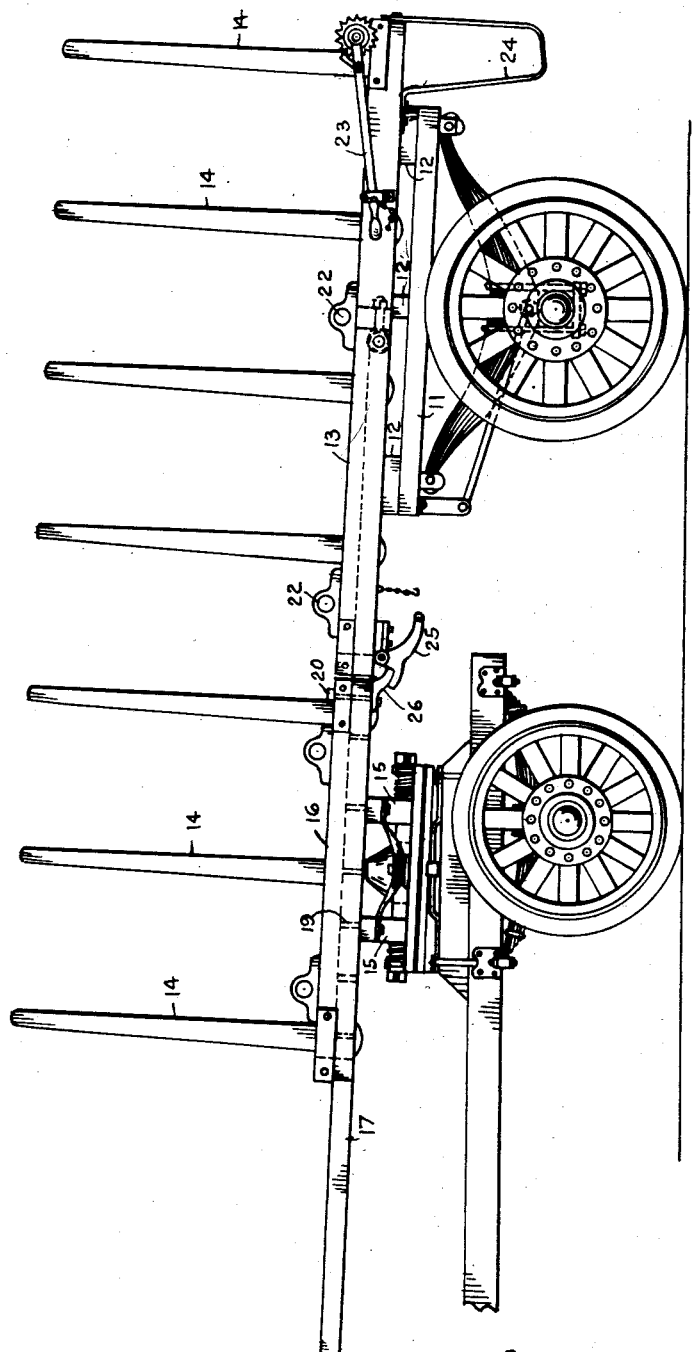

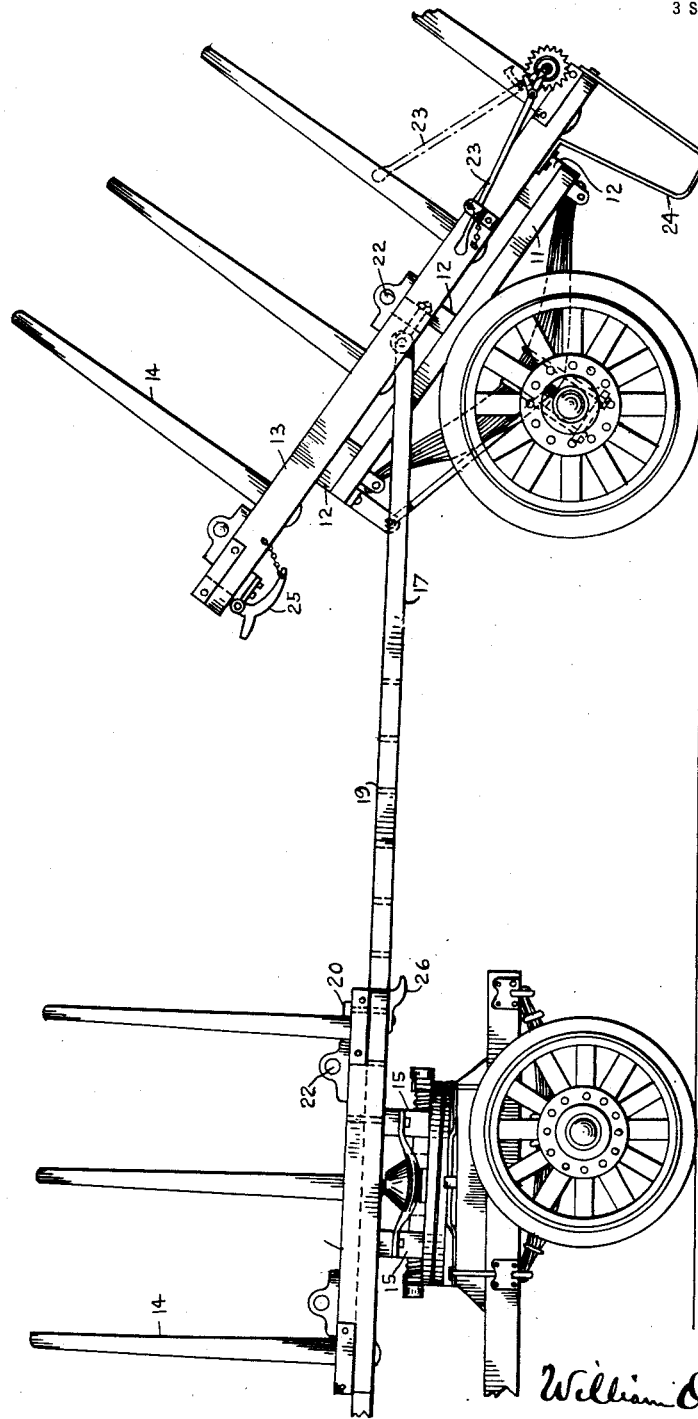

UNITED STATES PATENT OFFICE.

WILLIAM OSCAR SHADBOLT, OF BROOKLYN, NEW YORK.

TRUCK.

1,399,583.  Specification of Letters Patent.  Patented Dec. 6, 1921.

Application filed February 19, 1919. Serial No. 278,082.

*To all whom it may concern:*

Be it known that I, WILLIAM OSCAR SHADBOLT, a citizen of the United States, and a resident of the borough of Brooklyn, in the city and State of New York, have invented certain new and useful Improvements in Trucks, of which the following is a specification.

My invention relates to vehicles or trucks of the type which is commonly employed for transporting lumber, telegraph poles or similar articles, which are sometimes of considerable length and at other times shorter and for the transport of which it is desirable to provide a vehicle which is not only adapted to carry the said materials in a convenient and commercially practicable manner but which is also capable of being easily lengthened and shortened so as to be adapted to articles of different lengths and which is also adapted to connect either in extended or contracted position with a motor truck, and to easily dump the load in a compact pile.

In the said drawings Figure 1 represents a side elevation of a truck constructed according to my invention showing the truck shortened and in the position occupied when a load is being carried; Fig. 2 is a plan view of the same; and Fig. 3 is a side elevation, showing the truck lengthened, and also with the rear part in the tilting position which it assumes when the load is being delivered from the truck.

In carrying my invention into effect in the embodiment thereof which I have selected for illustration in the accompanying drawings and description in this specification, I provide front and rear running gear of the usual or any suitable type, the front running gear being provided with a fifth wheel. It will of course be understood that what I have designated the front running gear may in fact constitute the rear running gear of a tractor, upon which the front end of the truck is supported and by which it is drawn. As the running gear, fifth wheel, and auxiliary parts may be of any suitable type, and as they are well understood in the art, it is unnecessary to describe the same in detail.

Supported upon the springs of the rear running gear is a frame comprising longitudinal members 11 and transverse members 12, and upon these is mounted the rear carrying floor 13 of the truck; in the drawings I have shown the same provided with the usual removable standards 14.

Mounted upon the upper member of the fifth wheel are members 15 and to these are secured the front portion of the carrying floor 16, which may also be provided with removable standards 14. Secured to the rear carrying body 13 are reaches 17 which extend forward underneath the front carrying body 16 and which are slidably mounted upon said fifth wheel and adapted to project forward of the front running gear, as shown in Fig. 1. In the preferred form of the invention these reaches are pivotally secured to the rear carrying body as shown in the drawings.

The reaches 17 are provided with a series of sockets 19, and the front carrying body 16 is provided near its rear, with a perforation on each side, through which are inserted bolts 20. These bolts are adapted to pass down into the sockets 19, thereby holding the front carrying body 16 at any desired location on said reaches, as for instance close up to the rear carrying body 13 as shown in Fig. 1 or at some distance away from same as shown in Fig. 3.

Rollers 22 are provided on the truck floor, the rearmost of which is equipped with a pawl and ratchet, and an operating lever 23, of the usual or any suitable type, to assist in discharging the load. A support 24 is provided at the rear of the carrying body 13, to prevent the same from tilting too far, as shown in Fig. 3.

A pivoted latch 25 is provided on the rear tilting body 13, which is adapted to engage with a stop 26, and which serves to maintain the tilting body in its horizontal position when the parts are in the position shown in Fig. 1, being more particularly employed when no load is being carried.

The operation of my invention is as follows. When a load of comparatively short material is to be carried, the two carrying bodies are brought near together, as shown in Fig. 1 and secured by the bolts 20, but when a longer load is to be carried, the front carrying body 16 is moved forward and secured by the bolts 20 in any desired position. When the load is to be discharged, the rear supporting roller is operated until the load is moved far enough back to tilt the rear carrying body, when the rear end of the load falls upon the ground; the truck is then moved forward and the load dumped in a manner which will be obvious.

The advantages of my invention will be obvious from what has been said above with regard to construction and manner of operation. I would particularly call attention to the fact that in a vehicle constructed according to my invention the reach does not, when the vehicle is used in its shortened form, project out at the rear, but instead it projects forward of the front running gear.

Having thus described my invention, what I claim as new and desire to secure by Letters Patent is as follows:

1. An extensible truck adapted for motor trucking and comprising a body composed of separable sections, a rear axle supporting the rear body section, a forward axle, a fifth wheel disposed on said forward axle and supporting the forward body section, and a reach in sliding relation to said fifth wheel and projecting forward thereof in the contracted position of the truck, the forward body section being connected with said fifth wheel and slidably adjustable on said reach from or toward said rear body section.

2. An extensible truck adapted for motor trucking and comprising a body composed of separable sections, a rear axle supporting the rear body section, a forward axle, a fifth wheel disposed on said forward axle and supporting the forward body section, a reach in sliding relation to said fifth wheel and projecting forward thereof in the contracted position of the truck, the forward body section being connected with said fifth wheel and slidably adjustable on said reach from or toward said rear body section, and means for locking said forward body section at different points along said reach.

3. An extensible truck adapted for motor trucking and comprising a body composed of separable sections, a rear axle supporting the rear body section, a forward axle, a fifth wheel disposed on said forward axle and supporting the forward body section, and a reach pivotally connected at one end to said rear body section and slidable at the other end in ways of said forward body section, said reach projecting forward of said forward body section in the contracted position of the truck.

4. An extensible truck adapted for motor trucking and comprising a body composed of separable sections whereof the rear section is tiltable independently of the forward section, a rear axle supporting the rear body section, a forward axle, a fifth wheel disposed on said forward axle and supporting the forward body section, and a reach in sliding relation to said fifth wheel and projecting forward thereof in the contracted position of the truck.

5. An extensible truck adapted for motor trucking and comprising a rear running gear including a rear axle, a forward running gear including a forward axle, a draft means connected with said forward running gear, a fifth wheel supported by said forward axle above said draft means, a reach connected with said rear running gear and in sliding relation to said fifth wheel and projecting forward thereof in the contracted position of the truck, and a body composed of separable sections whereof the rear body section is mounted on said rear running gear independent of the front body section and the front body section is movable longitudinally on said reach in conjunction with the movement of the front running gear toward or from the rear running gear.

Signed at New York city this 3d day of February, 1919.

WILLIAM OSCAR SHADBOLT.